(12) United States Patent
Van De Witte et al.

(10) Patent No.: US 7,030,950 B2
(45) Date of Patent: Apr. 18, 2006

(54) METHOD OF MANUFACTURING A COMPENSATOR LAYER WITH RETARDATION FOILS EXHIBITING TILT ANGLES PARALLEL TO PLANES NORMAL TO THE FOILS AND ANGLED WITH RESPECT TO ONE ANOTHER

(75) Inventors: Peter Van De Witte, Eindhoven (NL); Johannes A. M. M. Van Haaren, Eindhoven (NL); Rifat A. M. Hikmet, Eindhoven (NL); Dirk J. Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/893,875

(22) Filed: Jul. 20, 2004

(65) Prior Publication Data

US 2004/0257508 A1 Dec. 23, 2004

Related U.S. Application Data

(62) Division of application No. 08/857,756, filed on May 15, 1997, now Pat. No. 6,784,960.

(30) Foreign Application Priority Data

May 17, 1996 (EP) .................................. 96201394

(51) Int. Cl.
*G02F 1/1335* (2006.01)

(52) U.S. Cl. ...................... 349/117; 349/118; 349/119; 349/121; 349/187

(58) Field of Classification Search ........ 349/117–119, 349/187, 121
See application file for complete search history.

(56) References Cited

U.S. PATENT DOCUMENTS

| 4,398,803 A | 8/1983 | Pohl et al. |
| 5,155,610 A | 10/1992 | Hikmet et al. |
| 5,210,630 A | 5/1993 | Heynderickx et al. |
| 5,583,679 A | 12/1996 | Ito et al. |
| 5,978,055 A * | 11/1999 | Van De Witte et al. .... 349/119 |

FOREIGN PATENT DOCUMENTS

WO WO 952445462 9/1995

* cited by examiner

*Primary Examiner*—James Dudek
*Assistant Examiner*—George Y. Wang

(57) ABSTRACT

A method of manufacturing a compensator layer features forming first and second retardation foils by polymerizing or vitrifying liquid-crystalline material comprising liquid-crystal molecules in manner wherein the liquid-crystal molecules in the polymerized or vitrified liquid-crystalline material of the first and second retardation foils respectively exhibit first and second tilt angles which are respectively parallel to first and second planes that are normal to major surfaces of the foils and that are angled with respect to one another by an angle of 60–120 degrees.

9 Claims, 4 Drawing Sheets

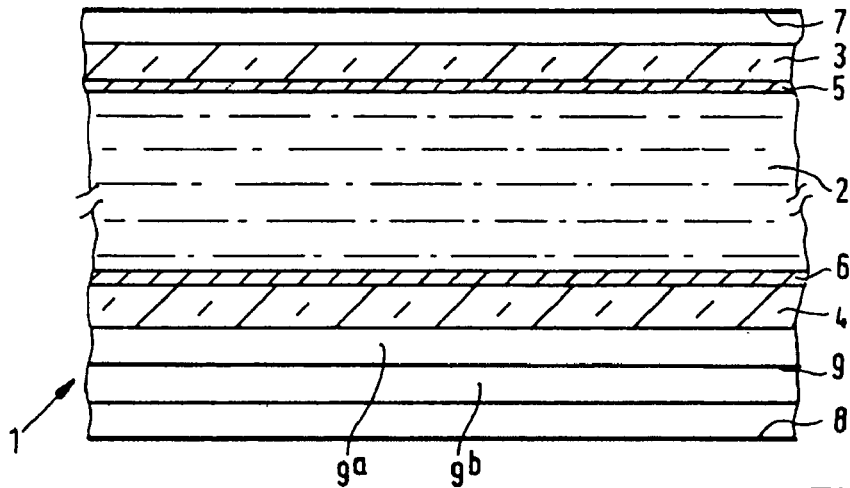
FIG. 1
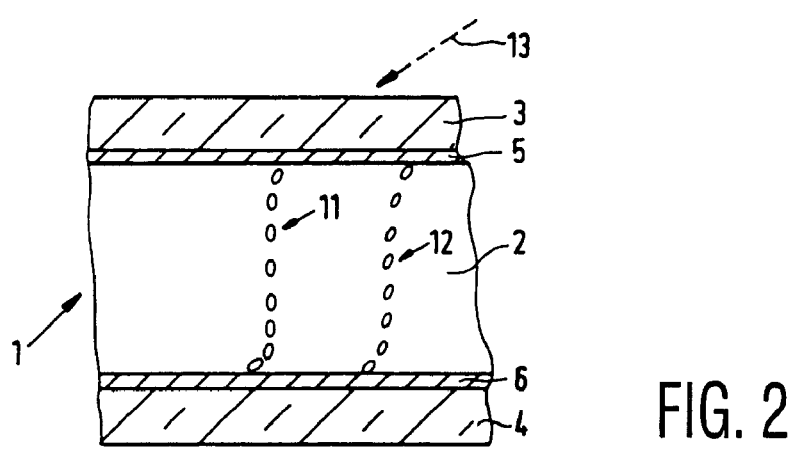
FIG. 2
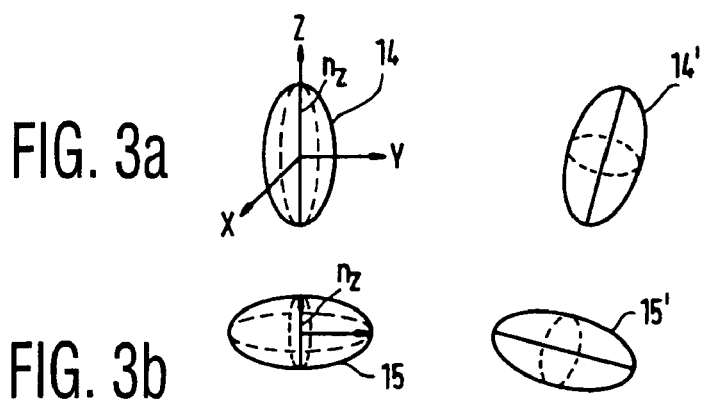
FIG. 3a
FIG. 3b
FIG. 3c
FIG. 3d

METHOD OF MANUFACTURING A COMPENSATOR LAYER WITH RETARDATION FOILS EXHIBITING TILT ANGLES PARALLEL TO PLANES NORMAL TO THE FOILS AND ANGLED WITH RESPECT TO ONE ANOTHER

CROSS-REFERENCE TO RELATED APPLICATIONS

The present application is a divisional of U.S. patent application Ser. No. 08/857,756 filed on May 15, 1997 U.S. Pat. No. 6,784,960 in the name of Peter Van De Witte et al., the entire contents of which are hereby incorporated by reference.

BACKGROUND OF THE INVENTION

1. Field of the Invention

The invention relates to a liquid-crystal display device having a display cell which comprises a layer of a nematic, liquid-crystal material between two substantially parallel substrates, which display cell is further provided with polarizers. The invention further relates to a compensator layer which can be used, for example, in liquid-crystal display devices, and to a method of manufacturing a retardation foil.

2. Description of the Related Art

Liquid-crystal display devices are generally used, for example, in monitors, TV applications and, for example, display devices in motorcars and for measuring instruments. The retardation foils can also be used in electro-optical modulators, for example, in welding goggles and in passive optical elements, such as microscopes and optical systems for optical data processing.

A display device of the type mentioned in the opening paragraph is known from U.S. Pat. No. 5,210,630. In said display device, a compensator foil consisting of an optically anisotropic layer of a cholesterically ordered polymeric material is used to counteract discoloration in a twisted nematic display device and to attain a high contrast. The polymeric material is ordered in such a manner that a molecular helix can be distinguished, the axis of the helix being directed at right angles to the layer.

However, display devices comprising such a compensator still have a great angle-dependence; this is to be understood to mean that the contrast is governed to a substantial degree by the angle or direction from which the display device is viewed.

One of the objects of the invention is to provide a display device of the type mentioned in the opening paragraph, in which the angle-dependence is reduced considerably. A further object of the invention is to provide a compensator layer which can be used, inter alia, in such display devices.

Therefore, a display device in accordance with the invention is characterized in that the display cell comprises at least two retardation foils which predominantly contain polymerized or vitrified liquid-crystalline material, the liquid-crystal molecules in the polymerized liquid-crystalline material exhibiting a tilt angle relative to the substrates, and the average directions of orientation of the liquid-crystal molecules in the polymerized or vitrified liquid-crystalline material of each of the retardation foils making an angle with each other which ranges between 60 and 120 degrees, viewed at right angles to the substrates.

The polymerized, liquid-crystalline material may be partly polymerized, but, preferably, it is polymerized substantially completely.

In this context, the direction of orientation of a liquid-crystal molecule is to be understood to mean the perpendicular projection on a substrate of the director of the liquid-crystal molecule. A retardation foil is to be understood to mean a birefringent foil or layer or a foil or layer having an optically compensating or delaying effect (an optically anisotropic layer).

The invention is inter alia based on the recognition that as a result of the tilt angle of the liquid-crystal molecules in the polymerized or vitrified liquid-crystal material, the retardation of one of the retardation foils compensates, as it were, for the retardation of a part of the liquid-crystal molecules in the display cell in the driven state; the retardation of the other retardation foil compensates, as it were, for the retardation of another part of the liquid-crystal molecules in the display cell in the driven state.

The invention is further based on the recognition that such layers of a polymerized liquid-crystal material can be manufactured in a simple manner, for example, by "spin-coating" of nematic liquid-crystal materials or by polymerization in the smectic C phase or by vitrification. Dependent upon the manner in which they have been manufactured, the liquid-crystal molecules in the polymerized liquid-crystalline material exhibit a tilt angle relative to the substrates, which varies (for example by using surface-active materials) or which is practically constant. This can be determined by means of conoscopy or microscopy using polarized light (polarizing microscopy).

A preferred embodiment of a display device in accordance with the invention is characterized in that the direction of orientation of the liquid-crystal molecules in the polymerized or vitrified liquid-crystalline material is substantially constant in at least one of the retardation foils.

In a liquid-crystal display device in which the customary voltage is applied across the liquid-crystal material in the on-state, the directors in this material actually still make a small angle with the direction perpendicular to the substrates. As a result, the birefringence is different at different viewing angles and non-symmetrical with respect to a direction perpendicular to the two substrates, which explains the angle-dependence of a liquid crystal having a nematic structure. This birefringence is caused, as it were, by two partial layers of a liquid-crystal material in which the optical properties of a partial layer are governed by the average tilt angle in the relevant partial layer with respect to the substrates and by the average direction of orientation; if a sufficiently high voltage is applied across the liquid-crystal layer, then the average direction of orientation in the partial layer is approximately equal to the direction of orientation, as determined by the orientation layers on the substrate, so that the magnitude of the difference between the directions of orientation of the two partial layers is practically equal to the tilt angle. In accordance with the invention, the angle-dependence can be substantially eliminated by causing the average directions of orientation of the liquid-crystal molecules in the polymerized liquid-crystalline material of the retardation foils to intersect each other at an angle which is practically constant (for example equal to the twist angle of the display cell). The tilt angles of the liquid-crystal molecules in the polymerized liquid-crystalline material can be set relative to the substrates, such that the compensator composed of the retardation foils compensates the angle-dependence of the cell substantially completely.

During the manufacture of a retardation foil, the tilt of the liquid-crystal molecules (director profile) can be obtained by using a polymeric (or vitrified) material which is formed from a liquid-crystal monomer.

In principle, any liquid-crystalline polymeric materials can be used to produce the material for the retardation foils. However, use is preferably made of liquid-crystalline polymeric materials which are the reaction product of monomers or of a mixture of monomers comprising a reactive group. Such polymeric materials have the advantage that the liquid-crystalline groups can be oriented prior to polymerization. Polymerization causes such an orientation to be frozen as it were. It is noted that such a mixture may also comprise non-reactive liquid-crystalline monomers. The reactive monomers preferably comprise a liquid-crystalline group.

For the reactive group use can be made of vinyl ethers, thiolene systems or epoxy groups. However, use is preferably made of reactive groups in the form of (meth)acrylate groups. Monomers comprising a(n) (meth)acrylate group proved to be excellently processable. In principle, the monomers can be thermally polymerized. In practice, radical-polymerization under the influence of actinic radiation, in particular UV light, is the simplest way of polymerizing the monomers. This has the advantage that persons skilled in the art can choose the temperature at which the mixture should be polymerized themselves. The choice of the temperature is often very important as the liquid-crystalline properties of the mixture to be polymerized are governed to a substantial degree by the temperature.

Preferably, the mixture to be polymerized also comprises monomers having two or more reactive groups of the above-mentioned type. During polymerization, the presence of such monomers leads to the formation of a three-dimensional network. This causes the optical properties of the inventive retardation foil to become less sensitive to variations in temperature. In particular for foils which are employed at different temperatures, such a small temperature-dependence of the optical properties is very favorable.

Liquid-crystalline molecules which can be used within the scope of the invention correspond to the general formula

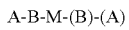

In this formula, M represents a liquid-crystalline group. Suitable M groups are disclosed, inter alia, in U.S. Pat. No. 4,398,803 and WO 95/24454. B represents a so-called spacer group. Dependent upon the desired properties, the monomers used comprise one or two spacer groups. Spacer groups are also known from the above-mentioned Patent publications. A represents a reactive group of the above-mentioned type. The liquid-crystalline molecules may comprise one or two reactive groups. As stated above, a part of the liquid-crystalline molecules in the mixture may be non-reactive. In that case, these molecules do not comprise A-type groups.

A preferred embodiment of the display device is characterized in that the polymerized material comprises liquid-crystalline molecules which are provided, at one end, with a non-polar group and, at the other end, with a polar group. The presence of this type of liquid-crystalline molecules causes the liquid-crystalline material of the mixture to be polymerized to assume the homeotropic phase at a short distance from the substrate. As a result, the desired ordering of the tilt in the liquid-crystalline material of the retardation foil takes place almost spontaneously. Consequently, in this case treatments with electric fields to induce said tilt are redundant. This simplifies the manufacture of such foils.

Liquid-crystalline molecules having a polar end and a non-polar end correspond to the general formula

where B and M have the above-mentioned meaning. In this case, the spacer group B serves as the non-polar group of the molecule and Z represents a polar group, such as —CN, —OH, —NO$_2$, —COOH or —C(O)O—CH$_3$. R represents a further substituent.

A further preferred embodiment of the display device is characterized in that at the end provided with the non-polar group, the liquid-crystalline molecules are covalently bonded to the polymerized or vitrified material. This is achieved if for R use is made of a reactive group of the above-mentioned type. By virtue of this measure, the optical properties of the inventive retardation foil become less sensitive to variations in temperature. In particular for foils which are employed at different temperatures, such a small temperature-dependence of the optical properties is very favorable.

The tilt may be substantially uniform. Alternatively, during the manufacture of the display device, a pretilt can be induced in one or both boundary surfaces, for example by means of the method described in U.S. Pat. No. 5,155,610. Dependent upon this pretilt, the optically anisotropic layer may exhibit, for example, a "splay deformation". The eventual director profile can also be influenced, during the manufacture, by means of electric and/or magnetic fields. This may result, for example, in a preferred direction for the directors. Such a preferred direction can alternatively be attained during polymerization in the smectic C-phase of liquid-crystalline materials.

These and other aspects of the invention will be apparent from and elucidated with reference to the embodiments described hereinafter.

BRIEF DESCRIPTION OF THE DRAWINGS

In the drawings:

FIG. 1 is a schematic, cross-sectional view of a part of a liquid-crystal display device in accordance with the invention, FIG. 2 shows a part of the device shown in FIG. 1, FIGS. 3a–3d schematically explain the optical behavior of a known device, which is similar to the one shown in FIG. 2, by means of so-called indicatrices, FIG. 4 schematically shows the differences between the display device in accordance with the invention and the display device in accordance with FIGS. 3a–3d, FIGS. 5 and 6 schematically show compensator layers in accordance with the invention.

DETAILED DESCRIPTION OF THE EXEMPLARY EMBODIMENTS

Figure 4:
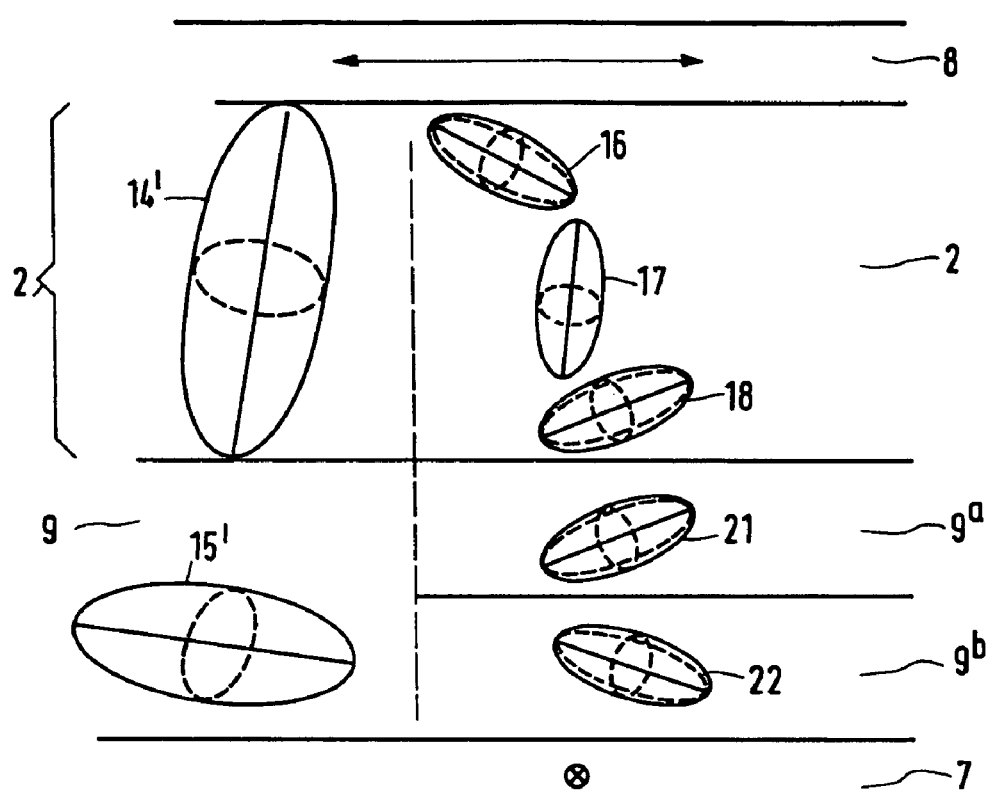

FIG. 1 is a schematic, cross-sectional view of a part of a liquid-crystal display device comprising a liquid-crystal cell 1 with a twisted nematic, liquid-crystal material 2 sandwiched between two substrates 3, 4, for example, of glass, which are provided with electrodes 5, 6. The device further comprises two polarizers 7, 8 whose directions of polarization intersect each other at right angles. The cell further includes orientation layers (not shown), which orient the liquid-crystal material on the inner surfaces of the substrates, in this example, in the direction of the polarization axes of the polarizers, so that the cell has a twist angle of 90 degrees. In this case, the liquid-crystal material has a positive optical anisotropy and a positive dielectric anisotropy. If a voltage is applied to the electrodes 5, 6, the molecules and hence the directors are oriented in accordance with the field. Thus, in an ideal case, all molecules extend substantially perpendicularly to both substrates (situation 11 in FIG. 2). In practice, however, this situation requires too high a voltage; at customary voltages, the molecules make a small angle with the normal to the substrates 3, 4, which corresponds to situation 12 shown in FIG. 2. Consequently, when the cell is viewed from direction 13, the viewer looks much more in the direction of the molecules, so that light which is still passed at this voltage, is subject to a substantial and, in addition, asymmetric angle-dependence. This angle-dependence can be explained by means of the so-called "optical indicatrix", i.e. a three-dimensional geometric display of the refractive index for each direction in which the vector of the electric-field component of the light can oscillate. In the case of an optically isotropic material, this optical indicatrix is spherical, in the case of a bi-axial material it is an ellipsoid and, in the case of uniaxial material it is an ellipsoid with axial symmetry. As, in an ideal case, the liquid-crystal material in the driven state is uniaxial across almost its entire thickness (in almost all molecular layers, except for a few molecular layers near the substrates, the molecules extend at right angles to the substrates), situation 11 shown in FIG. 2 can be represented by indicatrix 14 in FIG. 3$a$, which is an ellipsoid whose main axis extends transversely to the liquid-crystal layer, the refractive index $n_z$ at right angles to the substrates being larger than the refractive index in the planes extending parallel to the substrates ($n_x=n_y$).

As the liquid is not isotropic, birefringence occurs. It can be demonstrated that this birefringence can be compensated for by an indicatrix 15 in FIG. 3$b$, which is an ellipsoid whose axis extends transversely to the liquid-crystal layer, the refractive index $n_z$ at right angles to the substrates being smaller than the refractive index in the planes parallel to the substrates ($n_x=n_y$).

In practice, however, this situation requires too high a voltage; at the customary voltages, the molecules make a small angle with the normal to the substrates 3, 4, which corresponds to situation 12 in FIG. 2. As a result, when the cell is viewed from direction 13, a viewer looks much more in the direction of the molecules. In this more practical situation, the indicatrix 14' has a main axis which makes a small angle with the axis transverse to the liquid-crystal layer; indicatrix 14 is slightly tilted, as it were, relative to this axis. In this case, a good compensation is attained by a compensator layer 9 having an indicatrix 15', which is obtained by tilting, as it were, indicatrix 15 in the same manner relative to this axis.

FIG. 4 shows, on the left-hand side, the same situation, i.e. the liquid 2 with the associated indicatrix 14', and the compensator layer 9 with the associated indicatrix 15'; in this case, the liquid and the compensator layer are sandwiched between crossed polarizers 7, 8. As shown on the right-hand side of FIG. 4, the display device in accordance with the invention comprises, in this example, two retardation foils which predominantly contain polymerized liquid-crystalline material having a tilt angle of the liquid-crystal molecules in the polymerized liquid-crystalline material with respect to the substrates and an average direction of orientation of the liquid-crystal molecules in the polymerized liquid-crystalline material, which directions of orientation (in this example) make an angle of 90 degrees with each other, viewed at right angles to the substrates. In this example, the polymerized liquid-crystal molecules of the retardation foil 9$^a$ extend parallel to the direction of polarization of polarizer 8 and exhibit an average tilt angle of 40 degrees. In this example, the polymerized liquid-crystal molecules of retardation foil 9$^b$ extend parallel to the direction of polarization of polarizer 9 and also exhibit an average tilt angle of 40 degrees. For a possible explanation of the operating principle, the liquid layer 2 is divided into three parts which each have their own indicatrix 16, 17 and 18. Indicatrix 21 of retardation foil 9$^a$ now compensates, as it were, indicatrix 18 and a part of indicatrix 17, while indicatrix 22 of retardation foil 9$^b$ now compensates, as it were, indicatrix 16 and the other part of indicatrix 17.

The average tilt angle in the retardation foils 9$^a$, 9$^b$ may also be different, for example 40 and 50 degrees, respectively, which is achieved, in this example, by causing, for example, the other surface of retardation foil 9$^b$ to engage the upper surface of retardation foil 9$^a$.

On the one hand, the average tilt angle in the retardation foils 9$^a$, 9$^b$ is preferably larger than 10 degrees because smaller angles cause the difference in optical behavior between directions parallel and anti-parallel to the projection of the directors on the substrate to be too small; on the other hand, this tilt angle should preferably not exceed 70 degrees because, otherwise, the retardation foils acquire too much axial symmetry as a function of the viewing angle. In the present case, the retardation layer is drawn in one piece, however, the layers may also be situated on either side of the liquid, or the entire layer may be situated on the other side of the liquid.

Figure 7:
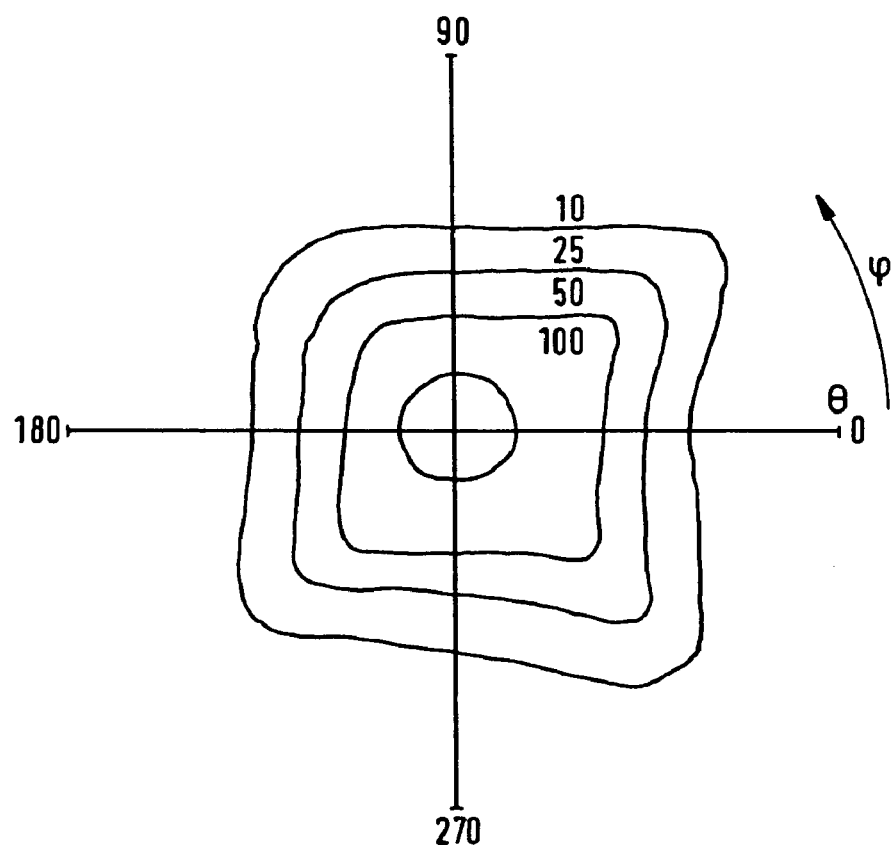
FIG. 7 shows iso-contrast curves of a display device in accordance with the invention.
Figure 8A:
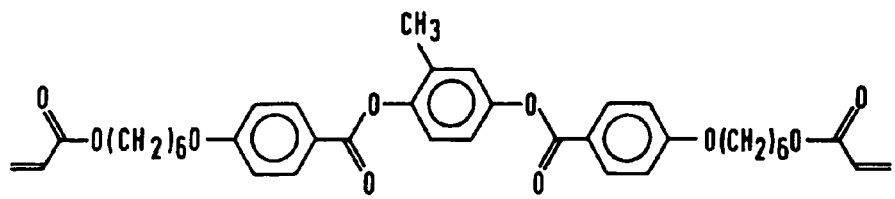
FIGS. 8a–8g show the structural formulas of a number of materials used.
Figure 8B:
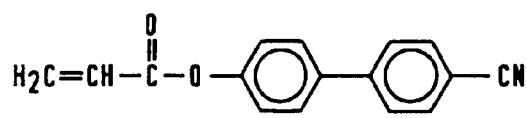
Figure 8C:
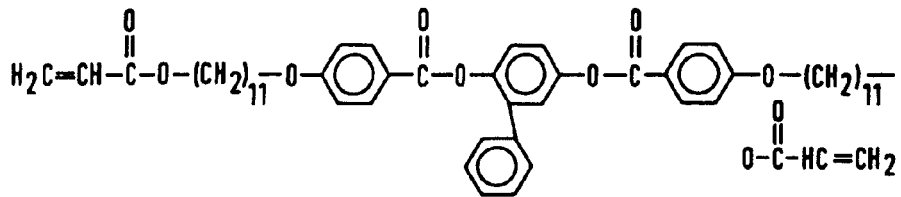
Figure 8D:
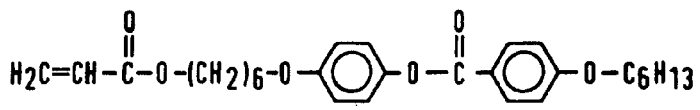
Figure 8E:
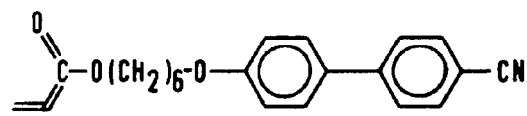
Figure 8F:
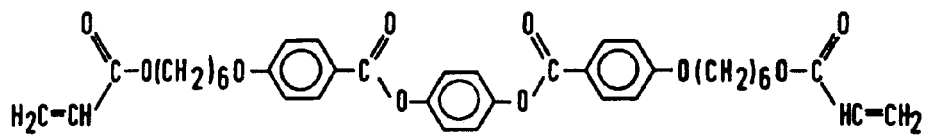
Figure 8G:
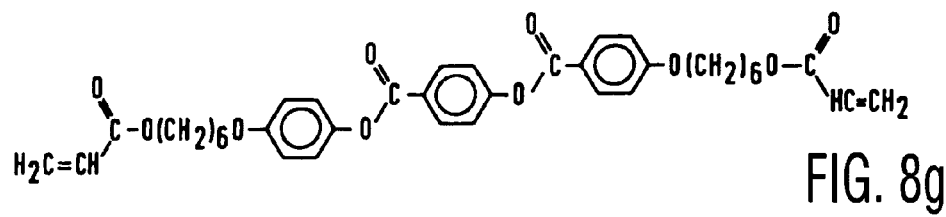

The associated iso-contrast curve is shown in FIG. 7. In this Figure, $\Phi$ represents the azimuth angle and $\theta$ represents the polar angle between the direction of view and the normal to the substrate.

The retardation foils can be manufactured, for example, by providing two glass plates (whether or not covered with ITO) with orienting layers, (for example polyimide rubbed in anti-parallel directions so that a high tilt is attained) which glass plates are held at a distance from each other by means of spacers. Between the glass plates, there is provided a suitable mixture of LC monomers, for example a mixture of 25 wt. % C6M (FIG. 8$a$) and 74 wt. % 495 (FIG. 8$b$) and a suitable initiator, whereafter this mixture is polymerized by UV radiation at 100° C. under the influence of a weak electric field.

Figure 5:
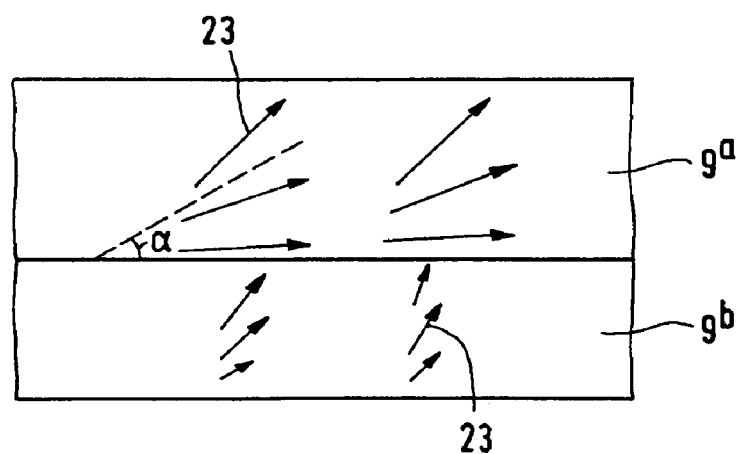

Another suitable mixture comprises 40 wt. % of a reaction LC material (a mixture of 25 wt. % 296 (see FIG. 8$c$) and 75 wt. % 716 (see FIG. 8$e$)) and 60% of a non-reactive cyanobiphenyl mixture. This mixture was spin-coated onto a glass plate covered with rubbed polyimide and subsequently polymerized by means of UV radiation in a nitrogen atmosphere. As, on the one hand, the molecules are oriented with a small tilt angle on the polyimide, and, on the other hand, tend to align homeotropically on the surface, an average tilt angle $\alpha$ is obtained (FIG. 5). A similar structure is attained with molecules which assume a homeotropic alignment on the substrate and a planar alignment on the surface. This can alternatively be achieved by means of other methods (provision by means of a doctor blade) and substrates (directly onto glass, onto a suitable synthetic resin such as cellulose triacetate). Another mixture, which did not comprise non-reactive liquid-crystalline material so that the strength of the layer was increased, was composed of 25 wt. % 296 (see FIG. 8$c$) and 75 wt. % 76 (see FIG. 8$e$).

A compensator layer 9 is obtained by joining two such retardation foils having different tilt angles, the directions of orientation of the molecules being rotated through approximately 90 degrees with respect to each other. FIG. 5 shows such a compensator layer comprising retardation foils having different tilt angles. A substrate may be sandwiched between the foils. In this case, the director 23 of the polymerized liquid-crystal molecules in retardation layer $9^a$ extends in the plane of the drawing, whereas the director 23 of the polymerized liquid-crystal molecules in retardation layer $9^b$ extends in a plane at right angles to the plane of the drawing (FIG. 5).

Figure 6:
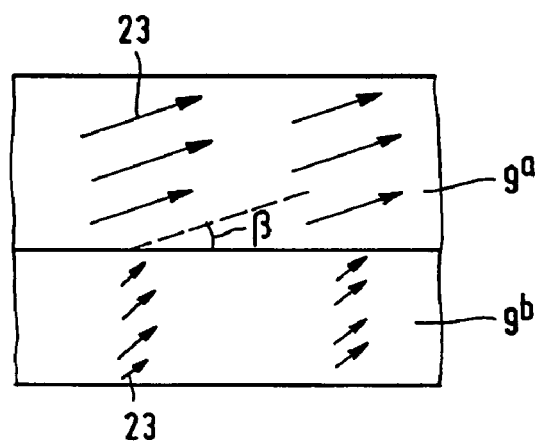

In the case of retardation foils having a substantially constant tilt angle, use can also be made of reactive liquid-crystal molecules as the starting material, which molecules are brought to the smectic C-phase between surfaces which bring about a homeotropic alignment, whereafter the molecules are polymerized again by means of UV radiation. In this manner, large tilt angles can be achieved (in the range between 40 and 89 degrees). As the eventual setting is temperature-dependent, the eventual angle can be influenced via the temperature setting. By way of example, use is made of a mixture comprising 54.5 wt. % C6H (No. 23) (see FIG. 8f), 44.5 wt. % No. 79 (see FIG. 8g) and a suitable initiator. The mixture was sandwiched between two glass plates which were provided with a layer of a homeotropically aligning material, for example a polyimide such as SE 7511L which can be obtained from Nissan Chemical. The mixture was subsequently cooled from 155° Celsius (isotropic state) to 82° Celsius (smectic state). To attain a uniform alignment, a minor shift of the smectic layers may be advantageous. Subsequently, the reactive molecules were polymerized again by means of UV radiation. FIG. 6 shows how two such retardation foils having a constant tilt angle β are combined into a compensator layer 9. Of course, the invention is not limited to the above-mentioned examples. For example, the twist angles of the display cell can be chosen to be unequal to 90 degrees, for example in the range between 60 and 120 degrees; in general, the angles between the directions of orientation of the retardation foils will also be adapted. Twist angles below 60 degrees lead to discoloration and imperfect extinction; twist angles above 120 degrees cause the transmission/voltage curve to become so steep that grey levels can no longer be realized.

It is not necessary that the directions of orientation of the molecules in the retardation foils extend parallel to the planes of polarization of the polarizers.

It is not necessary either to combine the retardation foils into a single compensator; in an alternative embodiment one retardation foil is provided on the side of one polarizer and the other retardation foil is provided on the side of the other polarizer. In a further example the retardation foils are provided on the outer surface or the inner surface of the cell. In the latter case, they can be applied directly onto the substrates or on other layers present in the cell, for example on a color filter or on a protective coating or top coating. If the hardness of the retardation foil is sufficient, its small thickness (up to approximately 0.5 Φm) renders it very suitable for use as a top coating. Besides, more than two retardation foils can be used. As mentioned hereinabove, according to the invention the foils are also obtained by vitrification of liquid-crystal molecules instead of polymerization.

In another embodiment viz. a colour liquid crystal display device having a colour filter the retardation foil has a patterned structure of different retardation values (e.g. by varying its thickness) in registration with elements of the colour filter.

For each separate colour the retardation of the associated part of the foil is optimized for a wavelength associated with said colour.

Instead of driving by means of electrodes on both supporting plates, as described hereinabove, alternative use is made of thermal addressing or addressing via plasma (plasma-addressed LCD). In the case of very large tilt angles in the retardation foils, it may even be advantageous in specific cases to provide the molecular structure with a twist so that the direction of the maximum contrast can be varied.

In summary, the invention relates to a liquid-crystal display device comprising a display cell and a plurality of retardation foils of polymerized or vitrified liquid-crystal material, which retardation foils have substantially complementary indicatrices so that each one of the retardation foils brings about the compensation of approximately half the display cell in the driven state.

What is claimed is:

1. A method of manufacturing a compensator layer comprising: forming first and second retardation foils by polymerizing or vitrifying liquid-crystalline material comprising liquid-crystal molecules in manner wherein the liquid-crystal molecules in the polymerized or vitrified liquid-crystalline material of the first and second retardation foils respectively exhibit first and second tilt angles which are respectively parallel to first and second planes that are normal to major surfaces of the foils and that are angled with respect to one another by an angle of 60–120 degrees.

2. A method as set forth in claim 1, wherein the forming of the first and second retardation foils is such that the angle between the first and second planes are that normal to the major surfaces of the foils lies in one of the ranges of 60–<90 and >90–120 degrees.

3. A method as set forth in claim 1, wherein the liquid-crystalline material comprises a reaction product of a monomers or of a mixture of monomers having a reactive group and which can be oriented prior to polymerization.

4. A method as set forth in claim 3, wherein the reactive group comprises one of a vinyl ether, a thiolene system, an epoxy group and a (meth)acrylate group.

5. A method as set forth in claim 3, wherein the monomers are polymerized using thermal polymerization or under the influence of actinic radiation.

6. A method as set forth in claim 5, wherein the actinic radiation comprises UV light.

7. A method as set forth in claim 5, further comprising the step of selecting the temperature at which the mixture is polymerized.

8. A method as set forth in claim 3, wherein the mixture comprises monomers having two or more reactive groups which during polymerization lead to the formation of a three-dimensional network.

9. A method as set forth in claim 1, comprising:
preparing liquid-crystal molecules which are provided, at one end, with a non-polar group and, at the other end, with a polar group;
applying the liquid-crystalline molecules to a substrate so that they assume a homeotropic phase proximate the substrate and so that a desired ordering of the tilt in the liquid-crystalline material of the retardation foil takes place almost spontaneously and obviates treatment with an electric field to induce the tilt.

* * * * *